US011183044B1

(12) United States Patent
Klein

(10) Patent No.: US 11,183,044 B1
(45) Date of Patent: Nov. 23, 2021

(54) WEARABLE BAND PROVIDING LOCATION PRESENCE AND FALL DETECTION

(71) Applicant: Hannah Clair Klein, Edina, MN (US)

(72) Inventor: Hannah Clair Klein, Edina, MN (US)

( * ) Notice: Subject to any disclaimer, the term of this patent is extended or adjusted under 35 U.S.C. 154(b) by 0 days.

(21) Appl. No.: 17/145,376

(22) Filed: Jan. 10, 2021

(51) Int. Cl.

| | |
|---|---|
| ***H04B 1/00*** | (2006.01) |
| ***G08B 21/04*** | (2006.01) |
| ***A44C 5/20*** | (2006.01) |
| ***G08B 25/10*** | (2006.01) |
| ***G08B 25/01*** | (2006.01) |

(52) U.S. Cl.
CPC .......... *G08B 21/043* (2013.01); *A44C 5/2033* (2013.01); *G08B 21/0446* (2013.01); *G08B 25/016* (2013.01); *G08B 25/10* (2013.01)

(58) Field of Classification Search
CPC .................................... H04B 1/00; H04L 1/00
See application file for complete search history.

(56) References Cited

U.S. PATENT DOCUMENTS 6,311,374 B1 * 11/2001 Anscher ............... A44B 11/263 24/625
2015/0104152 A1 * 4/2015 Reinhardt ............... G06F 3/165 386/243
2016/0038835 A1 * 2/2016 DeLaet ................... A63F 13/30 463/29
2016/0165387 A1 * 6/2016 Nhu ........................ H04L 67/10 455/41.1
2019/0165828 A1 * 5/2019 Nabki ................... H04L 7/0091

* cited by examiner

*Primary Examiner* — Shirley Lu
(74) *Attorney, Agent, or Firm* — DLA Piper LLP (US)

(57) ABSTRACT

A location and fall detection system (and method) includes a wearable band, a local gateway, and a cloud server. The wearable band includes an MCU, a radio-frequency pulse transmitter that periodically transmits a pulse, and a continuously sensing fall detection sensor. The MCU operates in low power mode except when a pulse is periodically transmitted, and when a fall is detected and a fall alert is transmitted. The gateway includes a radio-frequency pulse receiver and a data communication link to a cloud server. If a periodic pulse transmission is not received within a set period, the gateway transmits a location alert message to the cloud server. If a fall alert message is received the gateway likewise transmits a fall alert message to the cloud server. The band may further include a distress button that when activated, causes a distress message to be sent to the cloud server. The cloud server will contact various responsible parties as specified such as caregivers and first responders.

12 Claims, 16 Drawing Sheets

WEARABLE BAND PROVIDING LOCATION PRESENCE AND FALL DETECTION

CROSS-REFERENCE TO RELATED APPLICATIONS

Figure 1:
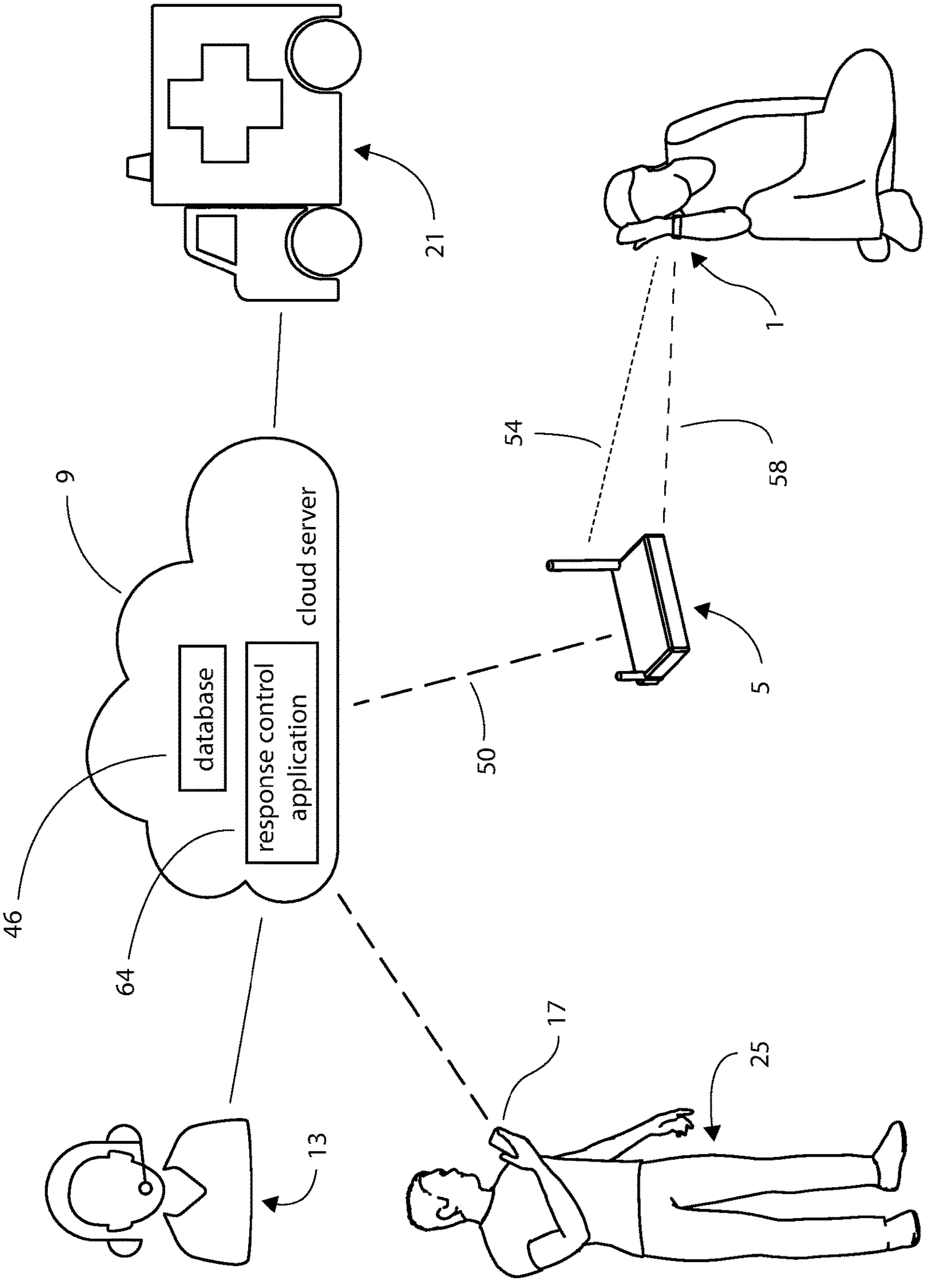

This application claims the benefit of U.S. Provisional Application No. 62/959,089 filed Jan. 9, 2020, entitled Wearable Band with Primary Battery Providing Location Presence and Fall Detection.

NON-PATENT LITERATURE REFERENCES

Ning Jia, Analog Dialogue, "*Detecting Human Falls with a 3-Axis Digital Accelerometer*", 43-07, July 2009

A. Y. C. Tang, A Ahmad, C. H. Ong, International Journal of Advanced Computer Research, "*Fall Detection Sensor System for the Elderly*", June 2015

BACKGROUND

Today's growing senior population wants to age in place. Families want to support their independence, worry-free, knowing loved ones are safe, while living apart. Consequently, relatively healthy older adults are often at risk for accidents in the home, the most common being falls. In other cases, an older adult may live with their children, but may be left alone while their children are at work or engaging in other activities. As adults advance in age, they may suffer cognitive difficulties such as Alzheimer's disease or dementia. The consequences of wandering vary from minor injuries, to high search and rescue costs and death. In these scenarios, older adult's caregivers have a need to monitor the status of older adult's whereabouts. In the following discussion of prior art, the term "subject" refers to the person whose health and location is of concern and to be monitored.

There have been inventions to address this need that involve wearable devices with associated sensing and communication capabilities. U.S. Pat. No. 8,766,789 by Cosentino et al, entitled First emergency response device discloses a wearable device that functions mainly as a subject-activated means for requesting emergency assistance. The device includes a button for the subject to activate in the event of a health emergency. This use case assumes that the subject is conscious and with sufficient mental acuity to perform the activation. There are many health related emergencies where this would not be the case, for example in the event of severe coronary arrest that results in a fall, or an accidental fall where the subject struck their head and was unconscious.

U.S. Pat. No. 7,893,844 by Gottlieb, entitled Fall detection system having a floor height threshold and a resident height detection device discloses a fall detection system that may be implemented with a range of height detection sensors that are used to determine the subject's height in relation to a reference structure. All of the height sensing technologies require a subject-worn sensor and a second reference sensor to provide an operable level of accuracy. Because of this requirement to wirelessly communicate with respect to the reference sensors, the power consumption of the subject-worn device will be significant, requiring that the device be removed or powered down often for recharging or battery replacement.

An imperative for a wearable alert device is constancy of monitoring and access, therefore the device must be worn or be accessible by the subject at all times. If a subject removed the device even briefly, for example while bathing, the device would potentially be out of reach in the case of a fall or other significant incapacitating health emergency. A device that is subject to frequent charging or battery replacement is more likely to be forgotten, or for the subject to decide not to retain the device.

To solve these drawbacks to the above mentioned inventions, what is required is an always-worn, long battery life monitoring device that reliably senses a fall. Location is another valuable sensing function for such a device. This always-worn device would also provide a subject-activated alert function so that the subject can alert caregivers in the event of a wide range of health-related or otherwise distress situations. Additionally the device should not be easily removable by the subject, insuring significant constancy of monitoring.

LIST OF DRAWING FIGURES

FIG. 1. is an illustration showing the wearable band and data, communication, and services system.

Figure 2:
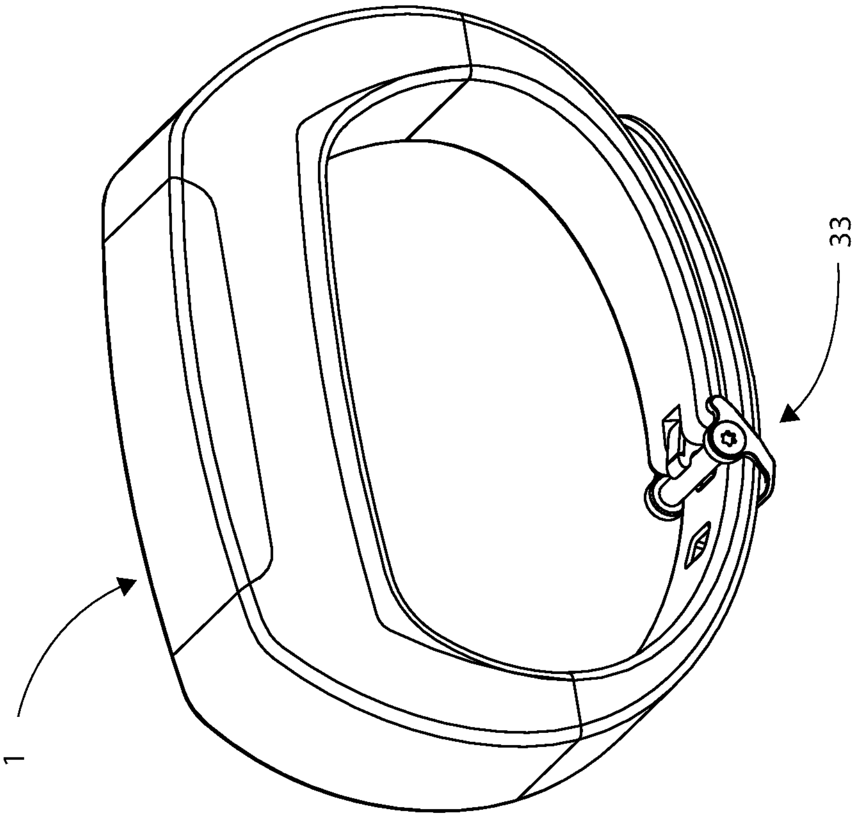

FIG. 2. is an illustration of the wearable band.

Figure 3:
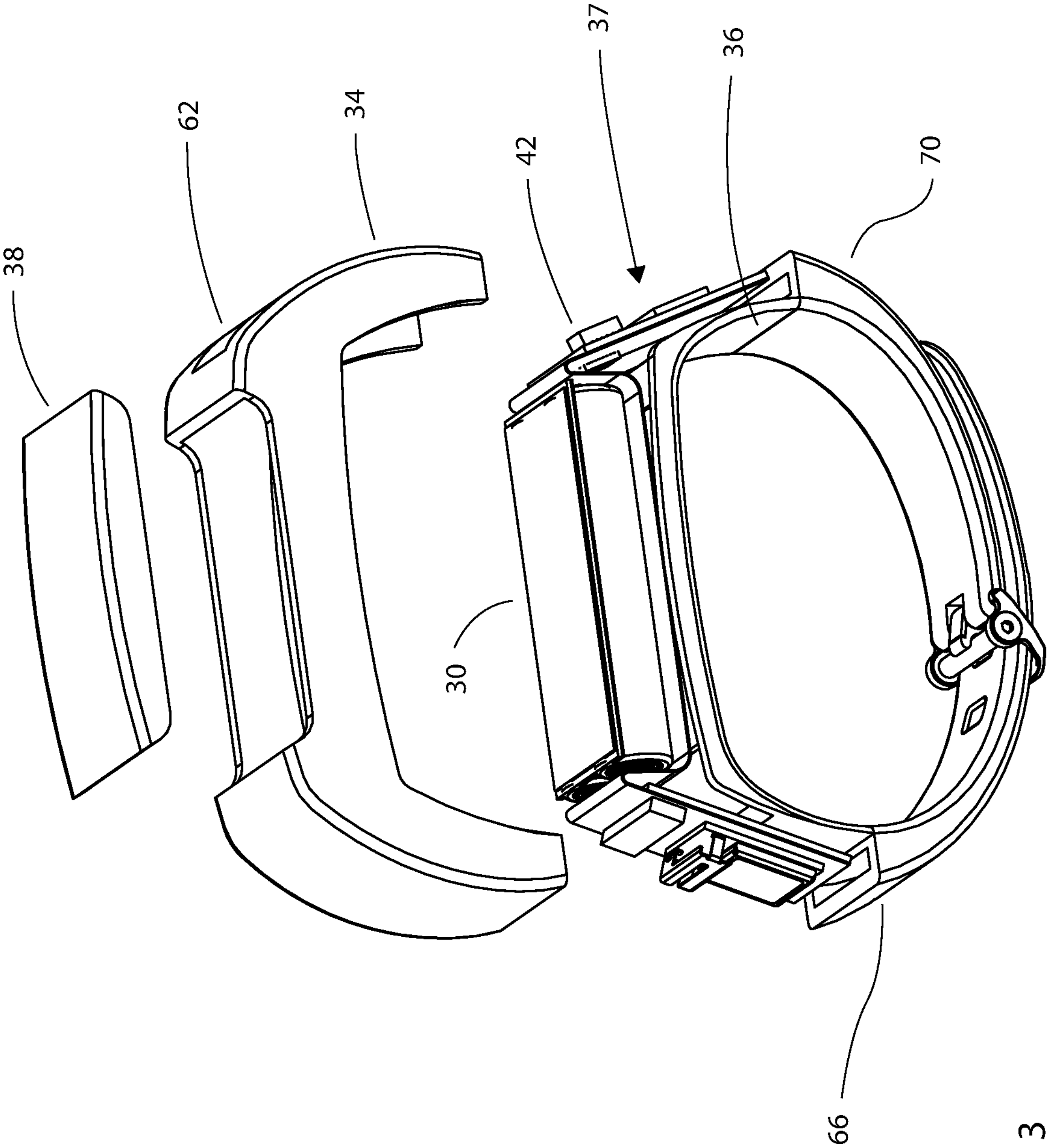

FIG. 3. is an exploded assembly view of the wearable band.

Figure 4:
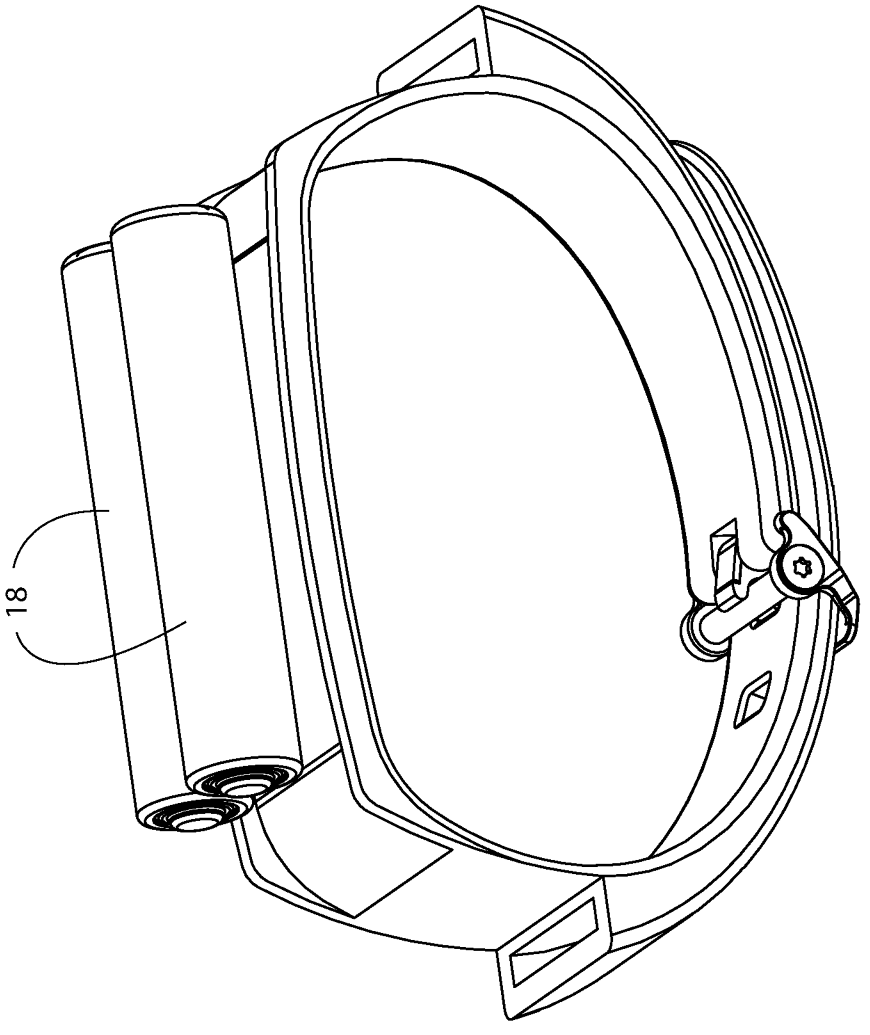

FIG. 4. is an illustration with the components hidden to show the battery configuration.

Figure 5:
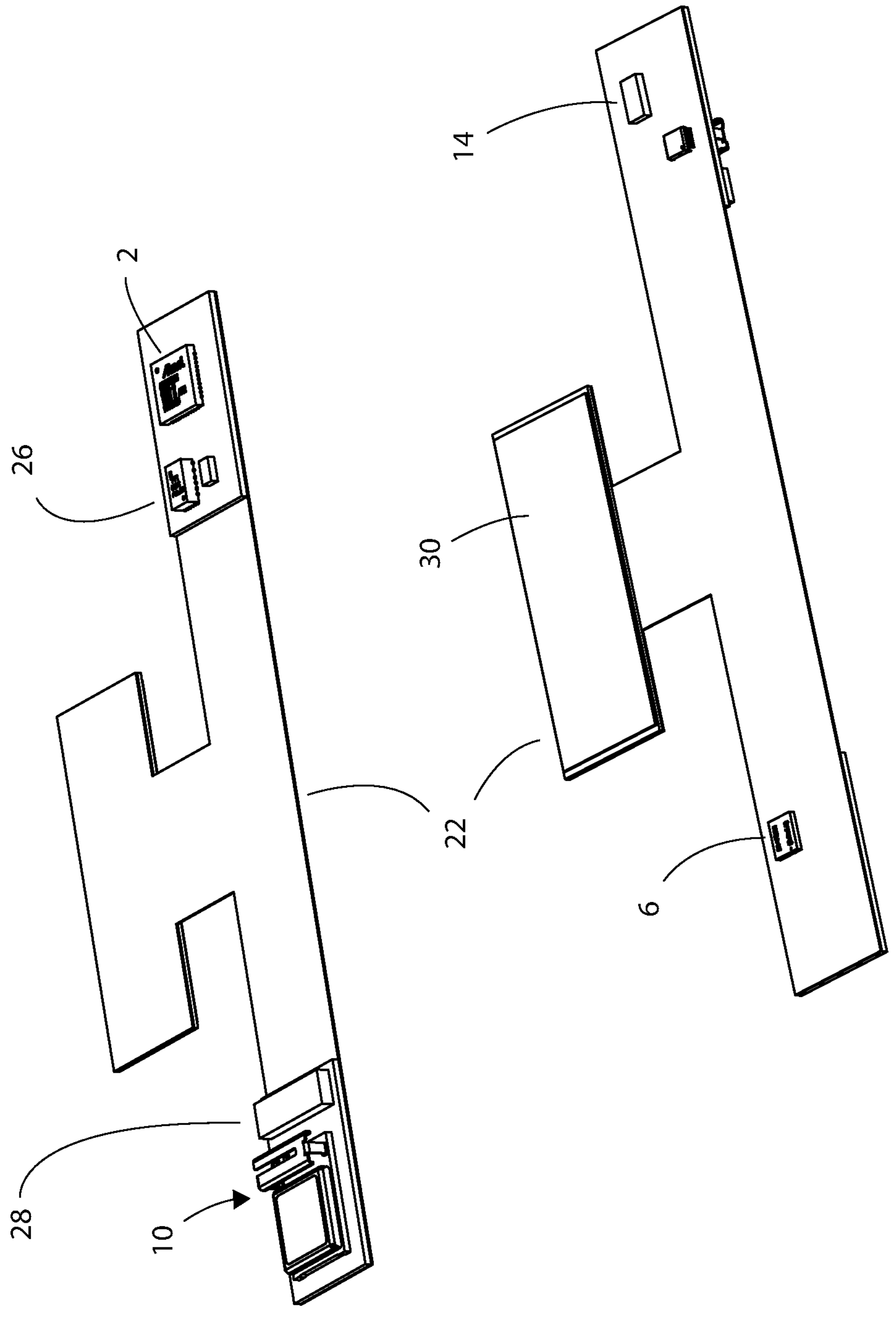

FIG. 5. is an illustration of the wearable band printed circuit board assembly folded and unfolded.

Figure 6:
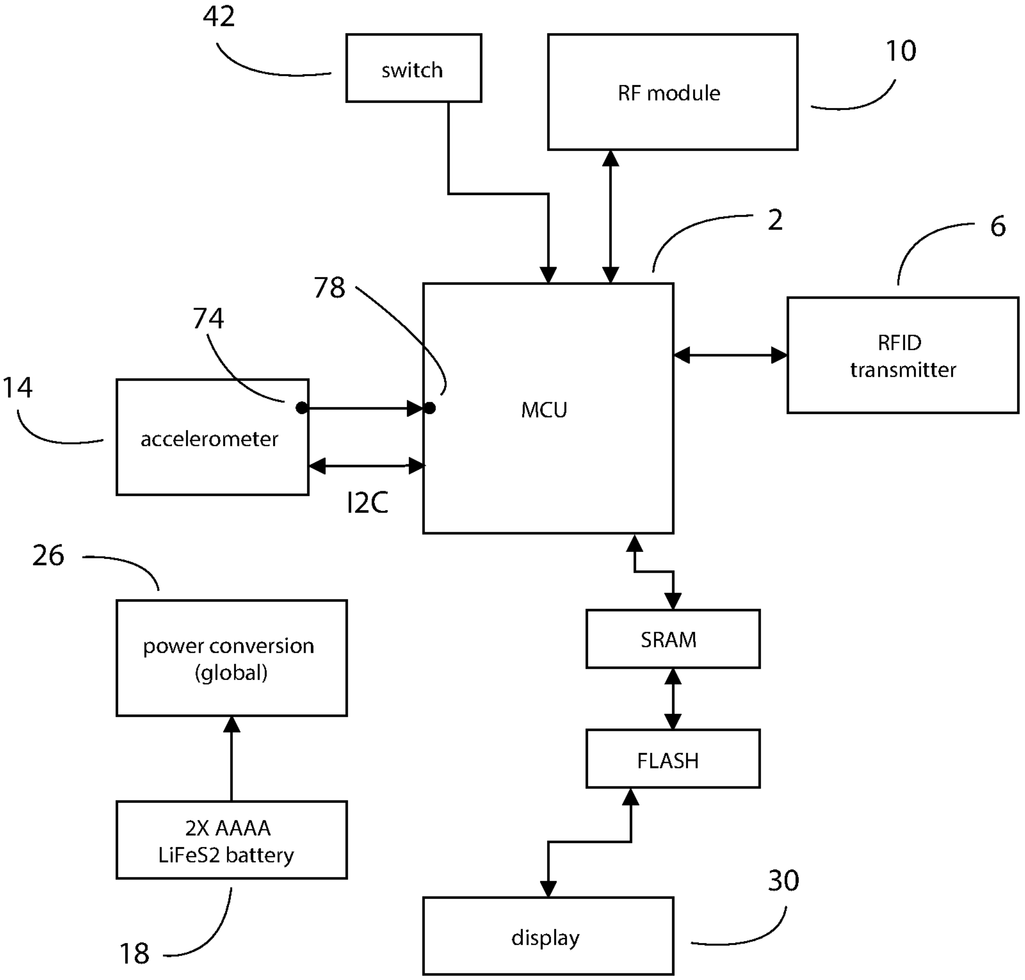

FIG. 6. is a block diagram of the wearable electronics subsystem.

Figure 7:
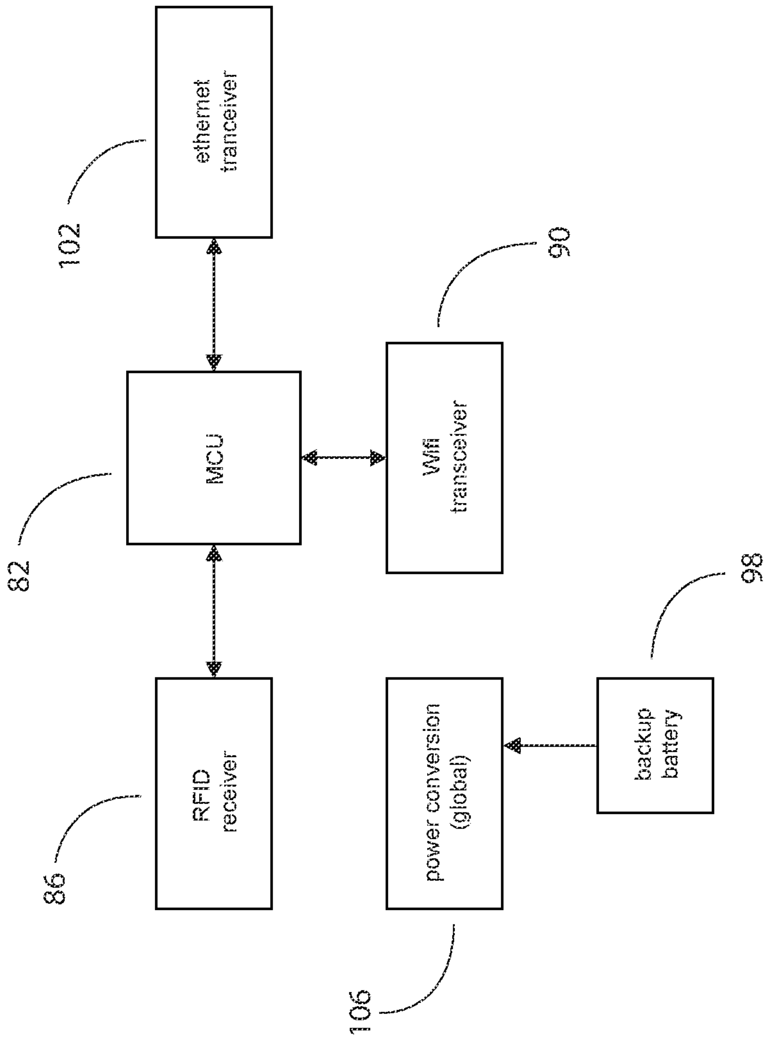

FIG. 7. is a block diagram of the gateway electronics subsystem.

Figure 8:
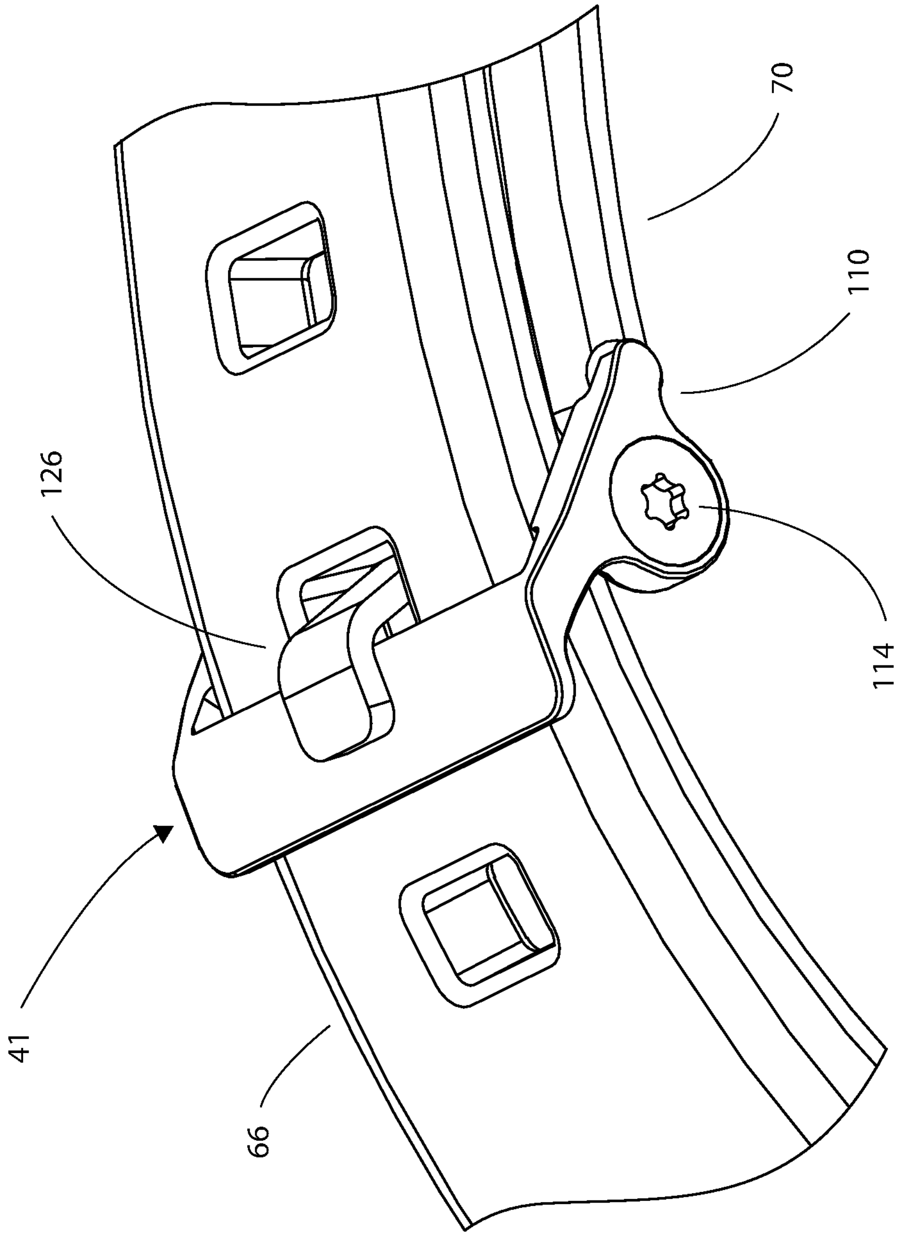

FIG. 8. is a bottom view of the buckle lock mechanism.

Figure 9:
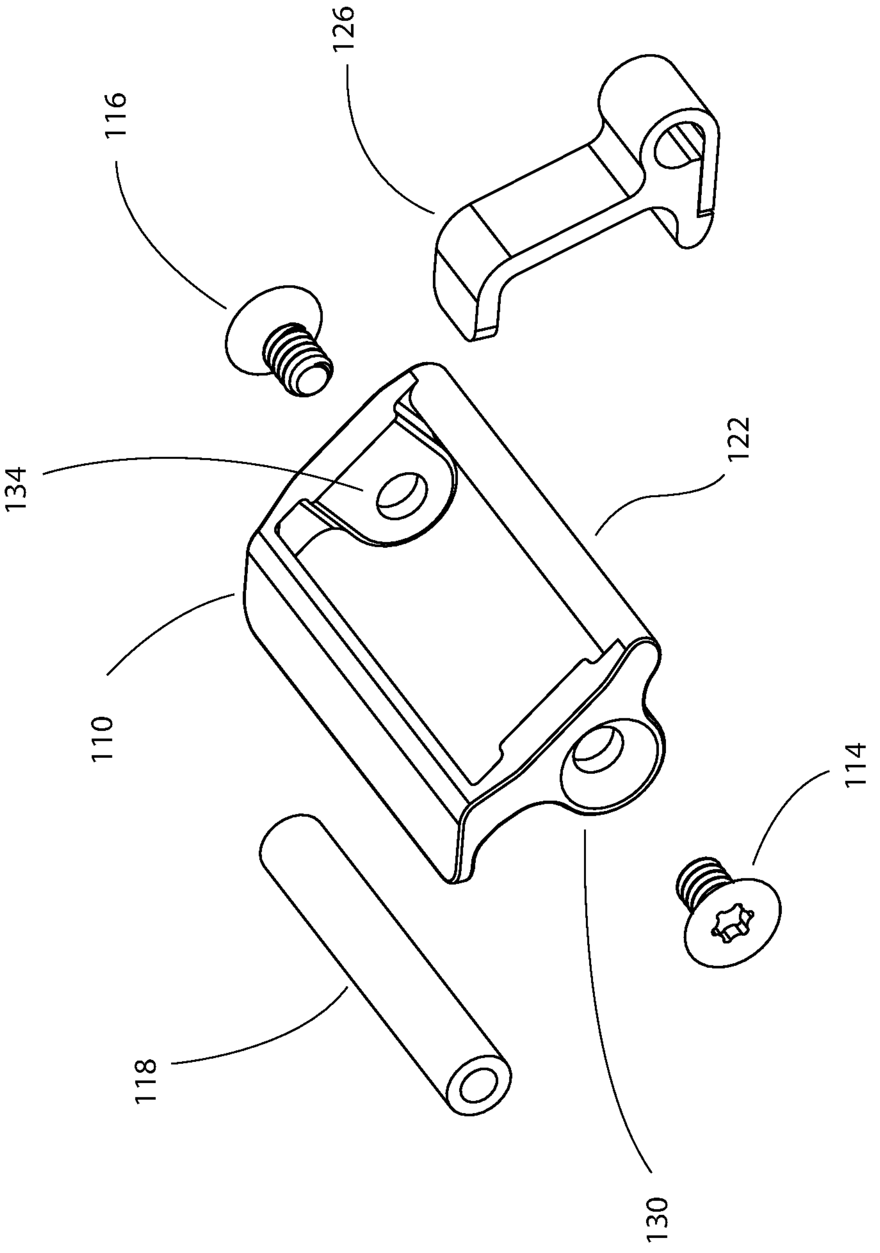

FIG. 9. is an exploded view of the buckle lock mechanism.

Figure 10:
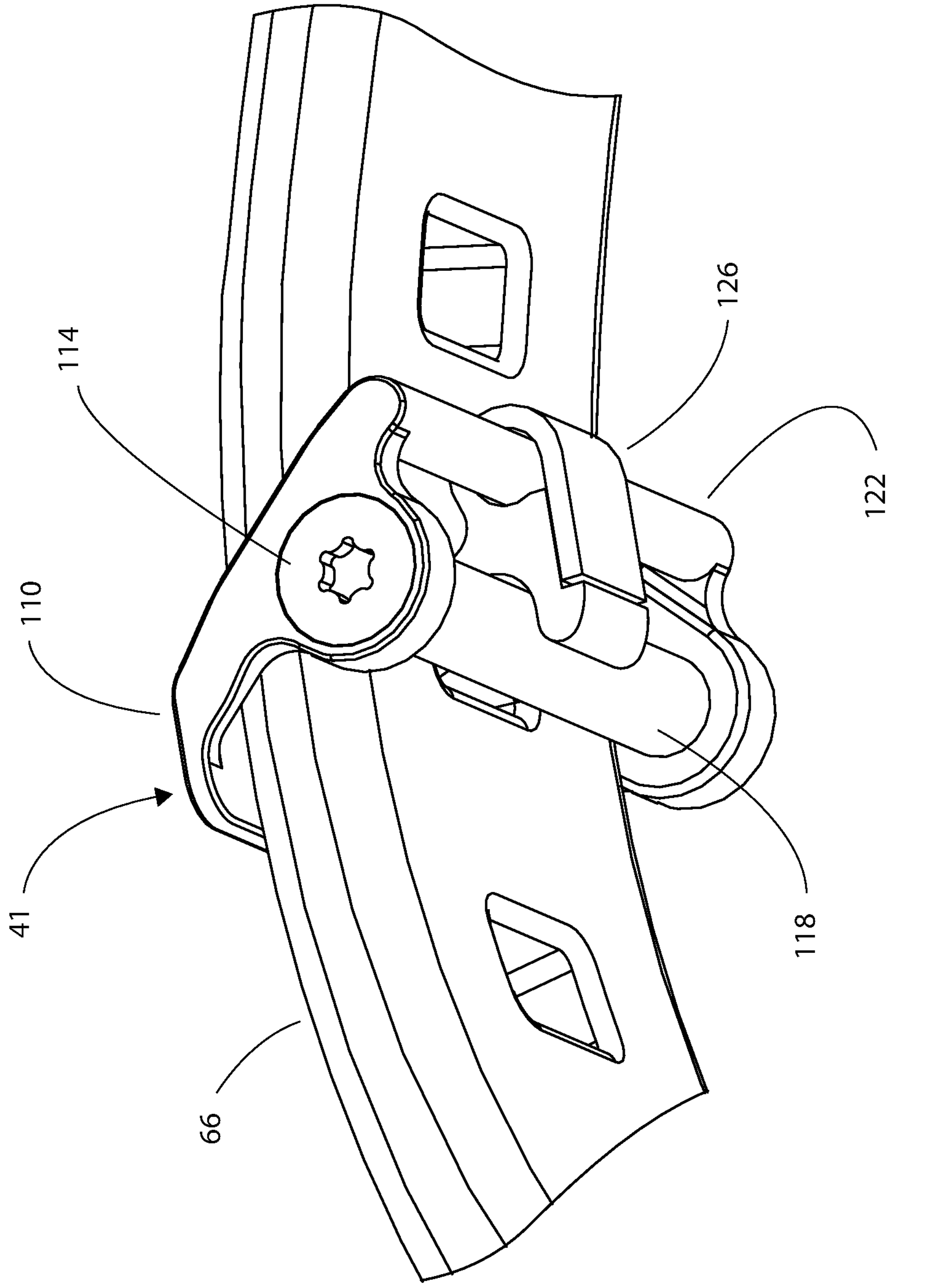

FIG. 10. is a top view of the buckle lock mechanism with the short strap hidden.

Figure 11:
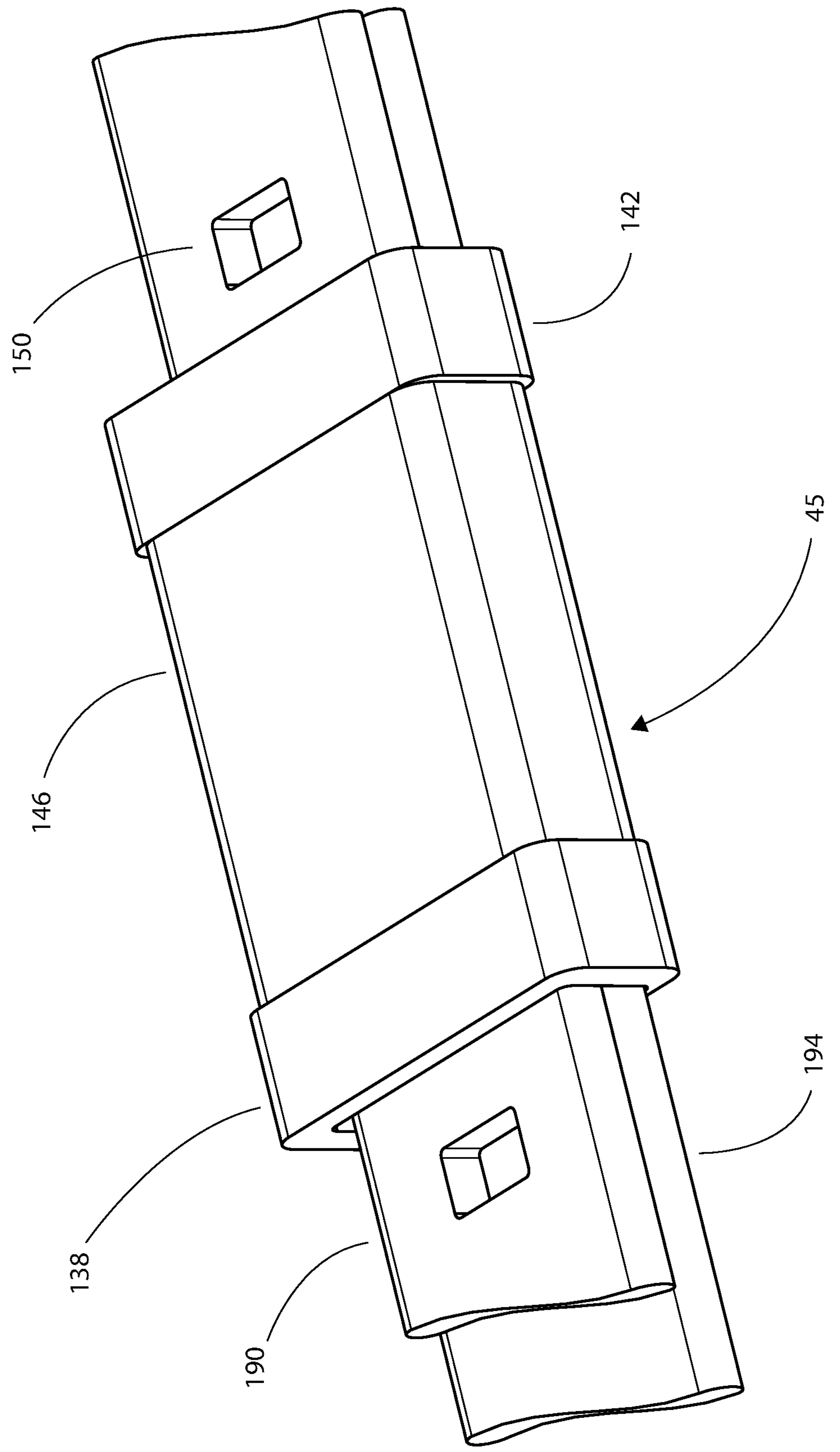

FIG. 11. is an illustration of a two-handed band clasp.

Figure 12:
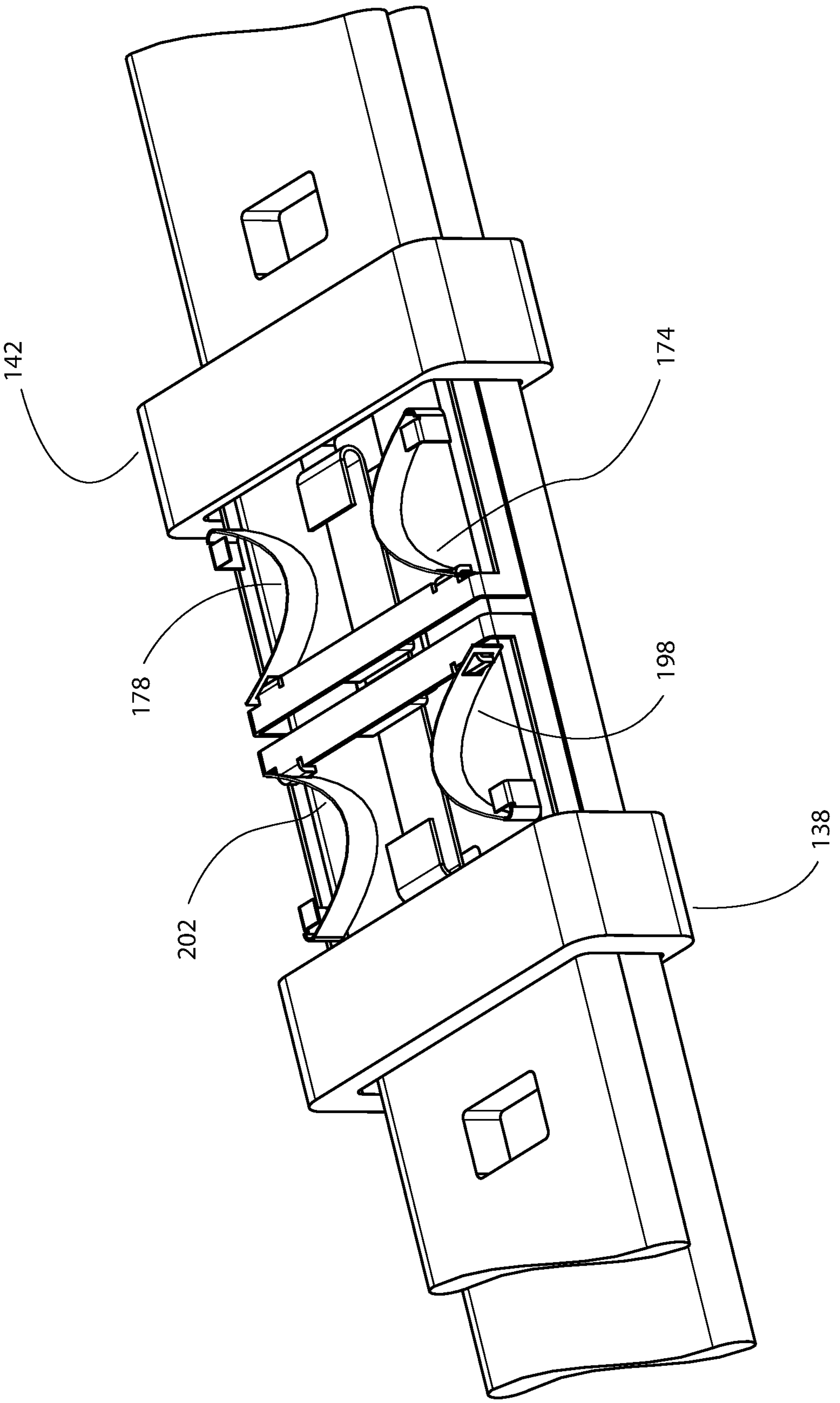

FIG. 12. is an illustration of a two-handed band clasp internal mechanism.

Figure 13:
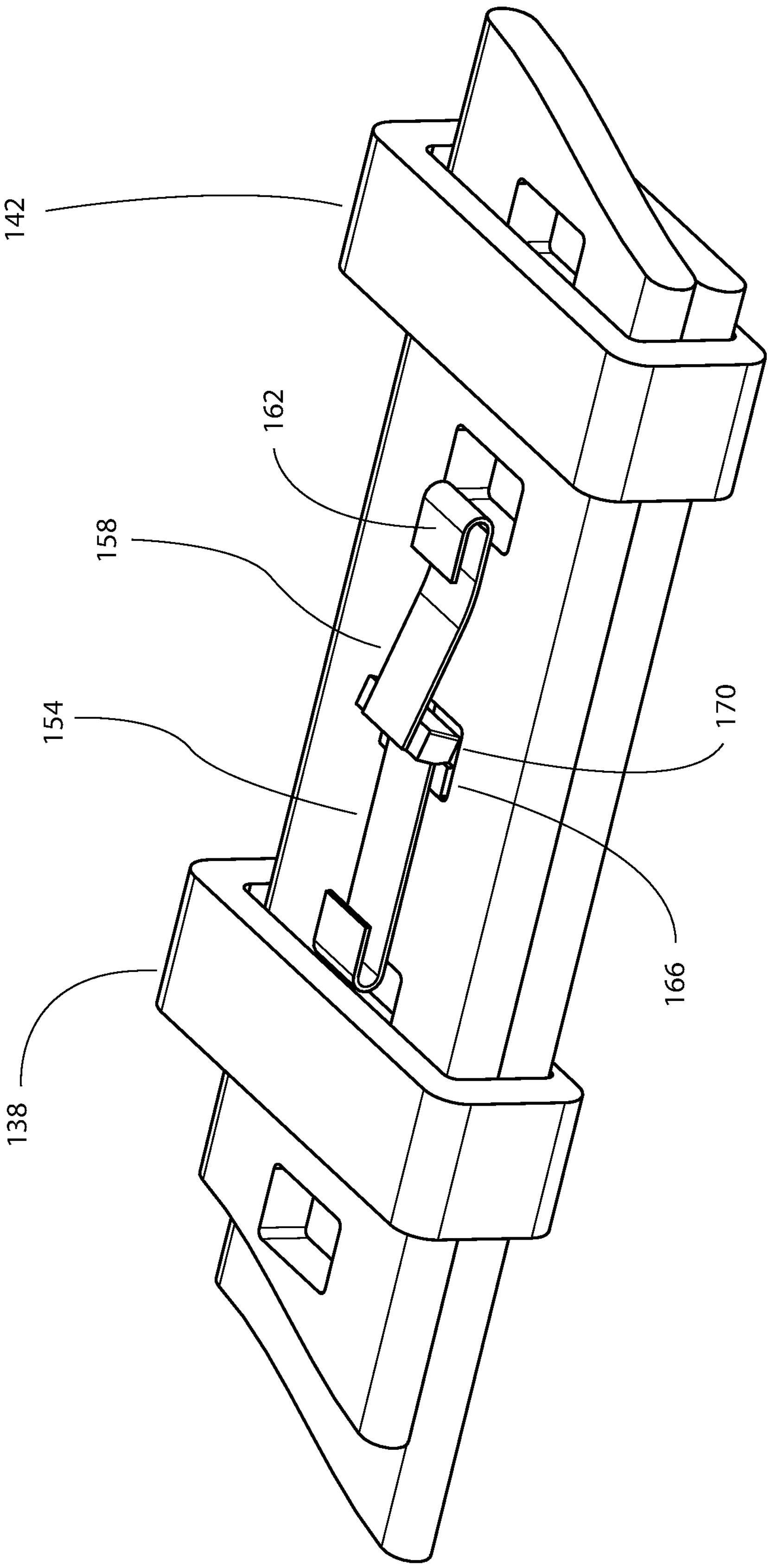

FIG. 13. is an illustration of two-handed band clasp spring prong flexures.

Figure 14:
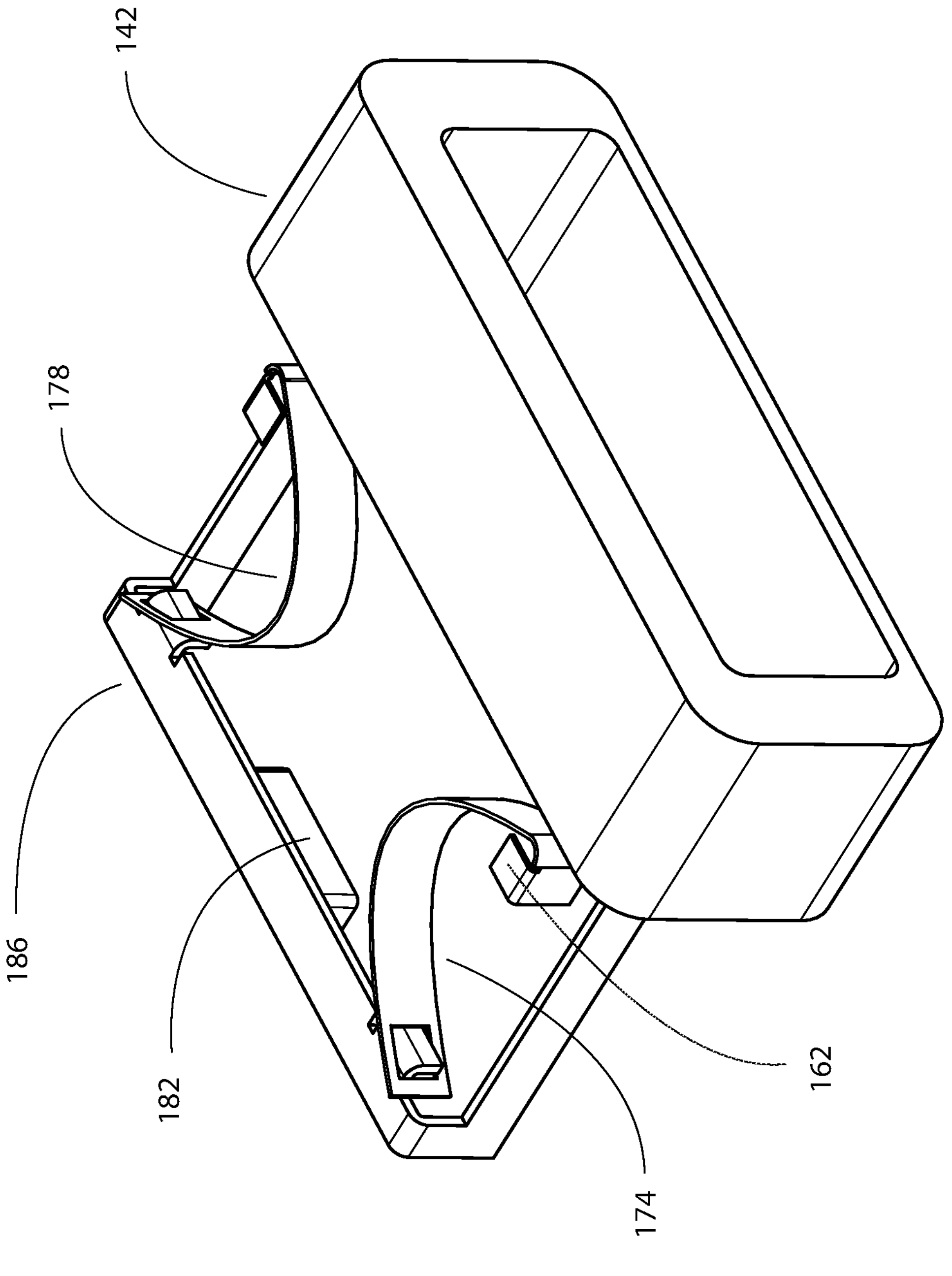

FIG. 14. is an illustration of a clasp presser and C-spring subassembly.

Figure 15:
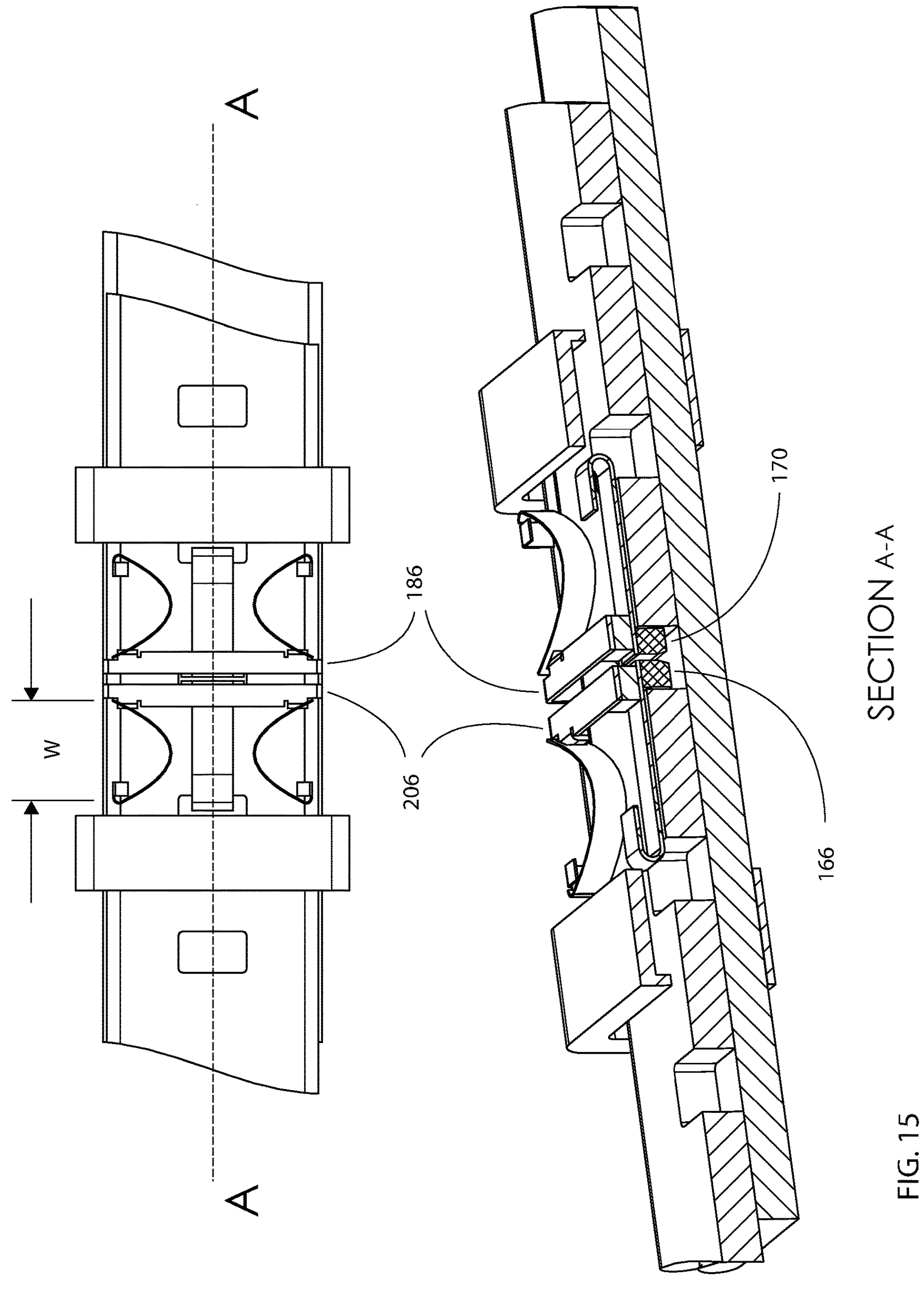

FIG. 15. is a section view of a two-handed band clasp engaged with a band.

Figure 16:
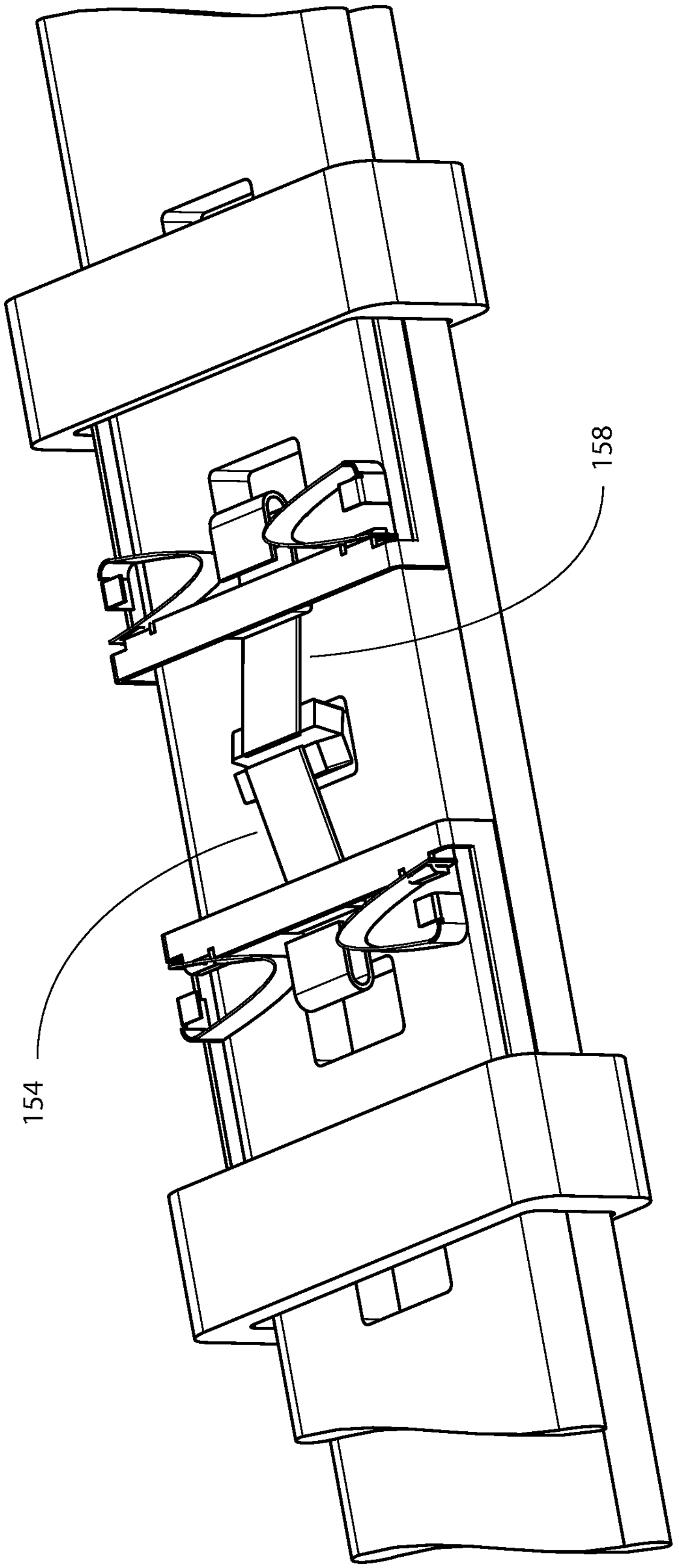

FIG. 16. is an illustration of a two-handed band clasp with prongs released from the band prong holes.

SUMMARY OF THE INVENTION

The wearable band providing location presence and fall detection is a system that functions continuously to monitor the location of the band wearing subject and to automatically communicate an alert to caregivers if the subject experiences a fall. The wearable band providing location and fall detection system is comprised of a wearable band device, a local communication gateway, and a cloud software application. The wearable band device includes a microcontroller, a fall detection subsystem, a wireless communication subsystem, and a battery. The fall detection and wireless communication subsystems are configured to use minimal power such that the band device can thus be worn continuously for many months without the need to re-charge or replace the battery. The band may also include a closure system that requires the use of two hands to remove the device from the subject's wrist.

The local communication gateway is line powered and is always on. The wearable band provides continuous information on the location of the band subject by periodically and briefly communicating with the gateway. If the band subject moves out of range of wireless communication with the gateway, absence of the periodic communication triggers the gateway to send a message with that information to the cloud application, which in turn will alert the subject's caregivers and/or other responders.

Likewise the fall detection sensing subsystem is configured to continuously monitor band motion. If a human fall motion is detected, the wireless communication subsystem is powered on and a fall alert message is sent to the gateway which in turn sends a fall alert message to the cloud server. The cloud application is programmed to alert the subject's caregivers and/or other responders.

In one embodiment the band includes an easily accessible button that the subject can press in the event of experiencing distress. When the button is pressed, the wireless communication subsystem is powered on and sends a message to the gateway, which in turn transmits an alert message to the cloud server. The cloud application is programmed to alert the subject's caregivers and/or other responders.

In another embodiment the wearable band includes a lower power display, for example an E-ink display that does not require power to maintain content on the display. In the event of a fall or distress button press, the display will show the subject's relevant information for the attending caregivers or responders.

Description of the Embodiments—Electronics Hardware

FIG. 1 shows a wearable band 1, a gateway 5, a cloud server 9 with a database 46, a wide area communication link 50, and a plurality of responsible parties that include a caregiver call center service 13, a relative 25, and a first responder 21. First wearable band 1 and gateway 5 hardware will be described.

Referring now to FIG. 1 through FIG. 6, wearable band 1 includes an electronics subsystem implemented as a printed board assembly 37 that includes a microcontroller unit 2 (MCU), a radio-frequency (RF) communication subsystem 10, a radio-frequency identification (RFID) subsystem 6, a power supply subsystem 26, a battery 18, an accelerometer 14, a display 30, a sound transducer, and a switch 42. The electronics subsystem components are assembled to and functionally connected by a rigid-flexible circuit board 22. Various passive and other electronic components are utilized in the electronics subsystem and will not be described in detail as their use and function would be obvious to an engineer skilled in the art of embedded electronics design.

In one embodiment MCU 2 is part number ATSAMD21G18A-48QFN, manufactured by Microchip, Inc. of Chandler, Ariz., and RF communication module 10 is part number NINA-W1X-102, manufactured by u-blox of Thalwil, Switzerland. Radio-frequency (RF) communication module 10 incorporates an ESP32 Wifi-Bluetooth LE combo integrated circuit (IC), manufactured by Espressif Systems of Shanghai, China. The ESP32 IC is an ultra-low power device. In one embodiment accelerometer 14 is part number ADXL345, manufactured by Analog Devices of Norwood, Mass. FIG. 6 shows that accelerometer 14 interrupt output port 74 is connected to an interrupt port 78 on MCU 2.

In one embodiment display 30 is a tri-color E-ink display that will retain an image when power is turned off.

In one embodiment RFID transmitter subsystem 6 includes a Si4012 crystal-less transmitter IC that is configured to transmit data in the 915 MHz ISM band. FIG. 5 shows a 915 MHz chip antenna that is part number W3211, manufactured by Pulse Larsen Antennas of Vancouver, Wash. In another embodiment, 915 MHz antenna is a plastic coated wire approximately three inches in length, which is a quarter wave antenna. The wire antenna is configured with a curved shape to fit inside of the enclosure.

In one embodiment acoustic transducer is a small piezoelectric transducer. In another embodiment acoustic transducer is a small full range speaker such as is found in many smartphones.

In one embodiment battery 18 is comprised of two AAAA size primary zinc manganese-dioxide batteries with a capacity of 700 milliamp hours (mAh).

In another embodiment the band includes a removable, rechargeable battery module. The removable battery module includes a lithium polymer cell, a protection circuit, and a V+ and ground charging contact.

In another embodiment wearable band electronics subsystem includes an audio processing subsystem comprised of a CODEC and a microphone.

In another embodiment electronics subsystem includes an external USB port to support functions such as updating software and adding new graphics files without utilizing internal battery power.

Gateway 5 includes an electronics subsystem comprising an MCU 78, an RFID receiver 86, a power conversion subsystem 106, an Ethernet transceiver subsystem 102, a Wifi transceiver 90 configured as an access point, and a backup battery 98 connected to power supply subsystem 106. Gateway 5 is normally powered by AC power by use of an external AC-DC converter.

In one embodiment Wifi transceiver 90 is part number NINA-W1X-102, manufactured by u-blox.

In one embodiment RFID receiver 86 is part number Si4355 Low Current sub-GHz receiver and is configured to receive data transmissions from RFID transmitter 6.

In another embodiment both band 1 and gateway 5 incorporate a low power integrated UHF transceiver operating at 915 MHz as the RFID communication subsystem, specifically, part number SX1231, manufactured by Semtech Corporation of Camarillo, Tex. The use of this transceiver part provides a low power bi-directional communication link between band 1 and gateway 5.

In another embodiment gateway includes a cellular data modem that communicates with cloud server via the cellular data network.

In another embodiment gateway 5 includes a GSM cellular modem for communication with cloud server. In one embodiment GSM transceiver is part number SARA-G450, a Quad-band GSM/GPRS module.

In another embodiment a gateway includes a charging dock for charging one or more rechargeable band battery modules. In this embodiment, the gateway includes a lithium ion battery charging subsystem.

Mechanical Hardware

FIG. 3 shows that band 1 electronics subsystem is enclosed in a flexible protective enclosure comprised of a top enclosure 34 bonded to a bottom enclosure 36. A transparent display cover 38 is configured over display 30. In one embodiment protective cover is injection-molded polycarbonate thermoplastic and is co-molded to top enclosure 34. A long strap 66 and a short strap 70 are bonded to flexible enclosure. Flexible enclosure, long strap 66, and short strap 70 are injection-molded out of thermoplastic elastomer material.

When assembled, flexible enclosure provides ingress protection rated at IP68, dust tight and immersible in one meter of water or more.

Lockable Band

In one embodiment wearable band includes a conventional buckle with a frame, bar, and prong. In another embodiment buckle is configured with a lock mechanism that requires two hands and a tool to unlock. Referring now to FIG. 8, FIG. 9, and FIG. 10 a locking buckle 41 includes a frame 110 with a bar 122, a prong 126, a lock pin 118, a screw A 114 and a screw B 116. The basic function of locking buckle 41 is the same as a conventional watch buckle. Prong 126 rotates on the center of a cylindrical bar 122 that is integral to frame 110. Prong 126 rotation is constrained by the planar portion of bar 122. Short strap 70 rotationally attaches to bar 122. Frame 110 also includes a boss A 130 and a boss B 134 aligned on the axis of the cylindrical openings.

After band 1 is placed on the wrist and buckle 41 is fastened, lock pin 118 is placed between boss A 130 and boss B 134 on frame 110. Screw A 114 is placed through a boss A 130 and screwed into lock pin 118. Screw B 116 is placed through a boss B 134 and screwed into the opposite side of lock pin 118. Prong 126 is configured with a protrusion such that when lock pin 118 is fixed in place, prong 126 is substantially constrained against the flat portion of frame 110 and buckle 41 cannot be unbuckled.

In one embodiment each of screw A 114 and screw B 134 are Torx flat head M1.6 thread size screws with a length of 3 millimeters. In one embodiment frame 110, prong 126, and lock pin 118 are made of stainless steel. Prong 126 is manufactured by metal injection-molding with a straight protrusion that is bent around bar 122 during band 1 assembly. Band 1 is not removable by the subject since lock pin 118 will rotate if a Torx screwdriver is applied to unscrew one of screw A 114 or screw B 116. Therefore in this embodiment two Torx screwdrivers are required to unbuckle buckle 41.

Description of the Embodiments—Software

Accelerometer 14 is a microelectromechanical system (MEMS) device configured for continuous low-power processing for sensing acceleration patterns indicative of a body falling from a substantially vertical orientation. In the embodiment incorporating part number ADXL345, the IC register setup and algorithm for human body fall detection is described in detail in the application note entitled "*Detecting Human Falls with a* 3-*Axis Digital Accelerometer*", published by Analog Devices, and is incorporated here by reference.

RFID transmitter 6 data transmission packet includes the following data: 1) unique band identification number, and 2) battery charge state. In one embodiment RFID data transmission packet is encoded with 128-bit encryption.

Description of the Embodiments—Function

In one embodiment wearable band 1 is designed to be worn by a user continuously without charging and therefore operates with extremely low power consumption to function as described herein for approximately one year.

In one embodiment wearable band 1 hardware and software is configured with three modes of operation:

Deep Sleep—All subsystems are powered down except for 1) a clock timer subsystem internal to MCU 2 and 2) accelerometer 14. The total power consumption in this mode is approximately 5 μA (microamps).

RFID Ping—A timer clock subsystem in MCU 2 functions as a counter to periodically wake specific subsystems in MCU 2, which executes software instruction to activate RFID transmitter IC 6. In one embodiment RTC subsystem wakes every 10 minutes to trigger RFID transmitter IC 6 to send a data transmission packet (a pulse transmission). In one embodiment MCU 2 wake-up and signaling to RFID transmitter IC 6, and subsequent RFID pulse transmission occurs in approximately 0.25 seconds. The net system power consumption during this function is 60 milliamps. Therefore band 1 operating at a 10 minute ping period for one year will use 31 percent of battery 18 with a 700 mAh capacity.

Fall Detection—Accelerometer 14 is configured to trigger MCU 2 interrupt upon three distinct events that are indicative of a body falling from a standing orientation: 1) freefall (gravity-like acceleration), 2) impact (sudden deceleration), and 3) minimal motion.

Fall Detection Function

Before a fall, MCU 2 is in Deep Sleep mode. Accelerometer 14 is operational and set up to detect falling, impact, and minimal motion. The maximum accelerometer 14 power consumption in this state is 120 μA. During periods of inactivity accelerometer 14 is in a deep sleep mode with lower power consumption.

Referring now to FIG. 6, each acceleration event sensed by accelerometer 14 triggers an interrupt at interrupt port 74 which is received on MCU 2 interrupt port 78. The interrupt from the first event, freefall, wakes MCU 2 from Deep Sleep mode. MCU 2 fall detection software instructions record the wake in the context of this interrupt. The two additional sequential interrupts indicate a fall.

The absence of at least one of the two interrupts indicates that a fall has not happened. In that case a timer interval executing on MCU 2 expires and software instructions function to revert MCU 2 back into Deep Sleep mode.

Upon receiving the three acceleration interrupts sequentially, and within a specific time frame, MCU 2 enters a higher power functional mode. RF communication subsystem 10, display 30 and driver circuitry, are also powered on. Referring to FIG. 1, a Fall Alert mode software subroutine is activated and the following functions are executed:

RF communication Link Established—RF communication subsystem 10 connects to a Wifi access point in gateway 5. Gateway 5 Ethernet transceiver subsystem 102 is also connected to internet cloud server 9.

Fall Alert Message—Referring again to FIG. 1, a Fall Alert message is sent to cloud server 9 which in turn routes the message to a responsible party such as a call center 13 or a caregiver 25, for example a relative of the user, as a text message and/or a call. The Fall Alert message includes the unique band identification number, battery 18 charge state, and a fall alert code. A Response Control software application 64 running on cloud server 9 accesses Database 46 and associates the unique identification number with contact information, for example the mobile phone number, associated with various responsible parties.

Medical Alert Message on Display—The Fall Alert software routine executing on MCU 2 erases the existing image on display 30, and writes a text message with the user's name, contact info of a responsible party, and relevant medical information, for example listing chronic conditions or medication information.

Sound Alert—In embodiments that include a sound transducer in band 1, the Fall Alert software routine executing on MCU 2 also triggers periodic audio alerts via the sound transducer.

Live Man Switch—The Fall Alert software routine executing on MCU 2 monitors switch 42 associated with the button 62 on wearable band 1. If the user activates button 62 within a specific time period after a Fall Alert has been transmitted, a Fall Alert Termination message is sent via the communication link described herein, to the responsible party.

Distress Alert—If button 62 on wearable band 1 is activated at any time not during a Fall Alert function, a Distress Alert message is sent to responsible parties via the communication link described herein.

Emergency Medical Services Call—Optionally cloud server 9 response control application 64 may be configured to send a text message and/or call to a first responder 21, such as an Emergency Medical Services (EMS) provider near the location of the subject, which dispatches EMS to the subjects's location. In this case cloud database 46 includes the physical address of the subject.

Real Time Audio Link—In the embodiment where wearable band 1 includes an audio processing subsystem and full range speaker, a voice link is established with one or more of the following, 1) an automated attendant, 2) a call center with live attendant 13, and 3) a nearby caregiver 25. Response Control application 64 includes an IP telephony software application that routes the audio stream to the selected entities.

Location Presence Function

Gateway 5 MCU 82 executes a Location Monitoring software application that monitors the periodic RFID pulse transmissions from band 1. The Location Monitoring application is programmed to control an MCU 82 clock timer that resets upon receipt of a pulse transmission from wearable band 1. Assuming a 10 minute transmission pulse period, if a pulse is not received from wearable band 1 within 10.2 minutes from the last pulse transmission, gateway 5 will send a Location Alert message to cloud server 9.

In another embodiment, Location Monitoring application 104 includes a settings function to allow a caregiver to select a band 1 distance from gateway 5 at which a Location Alert message is sent to cloud server 9. The signal strength of band 1 pulse transmissions can be used to calculate the approximate distance between band 1 and gateway 5. The distance setting sent to gateway 5 is based on this distance calculation and will allow a caregiver to customize the allowable distance that a subject wearing band 1 can travel before a Location Alert message is sent.

The receipt of a Location Alert message by Response Control application 64 will likewise trigger a number of actions including an automatic text message/call transmitted to a responsible party stating that the subject has left the vicinity of gateway 5. In another embodiment a nearby responsible party receives a text message or other notification that includes a link to a map with the home location. In another embodiment where the subject lives in an assisted care facility, the text message/call is sent to responsible parties at the facility.

In another embodiment a text message is sent to the nearest law enforcement office.

Band Subject State Data Access

The data associated with band 1 subject such as location, fall detection, and other data is aggregated on cloud server 9 and is formatted for presentation by Response Control application 64 in a variety of formats. In one embodiment the data is available via a secure website that is accessible to responsible parties and requires a login and password.

In another embodiment the data is available to authenticated responsible parties via a smartphone Caregiving app 17 that includes push notification capability. Caregiving app 17 user can choose to be notified via on-screen and/or audible notifications in the case of a band 1 subject leaving the vicinity of the home location, and in the case of a fall detection event.

Alternative Embodiment—Pulse Oximetry and Heart Rate Sensor

In another embodiment a pulse oximetry sensor is integrated into the band enclosure along the bottom surface so that the sensor is substantially in proximity with the skin. An exemplary sensor is part number MAX20102 High-Sensitivity Pulse Oximeter and Heart-Rate Sensor for Wearable Health, manufactured by Maxim Integrated Products, Inc., of San Jose, Calif. The sensor is nominally unpowered and is activated in the event of a fall or activation of the distress button. During one of these events, the subject's pulse oxygen level and heart rate are sensed and the data are sent to the cloud server where it is then distributed to the various responsible parties.

Alternative Embodiment—Two-Handed Band Clasp

FIG. 11 shows a band clasp 45 that requires two free hands to release that is comprised of a clasp shell 146, a release cap A 142 and a release cap B 138. A mechanism internal to clasp shell 146 functions such that release cap A 142 and release cap B 138 are spring-loaded against clasp shell 146, locking outer band 190 to inner band 194. Release cap A 142 and release cap B 138 must be simultaneously pulled away from clasp shell 146 to un-clasp, or release, outer band 190. Clasp shell 146 is a stamped steel sheet metal part and is fixedly attached to inner band 194 and sized such that outer band 190 slides freely through clasp shell 146 when clasp 45 mechanism is in released mode.

FIG. 12 shows two-handed band clasp 45 with clasp shell 146 hidden. Outer band 190 is configured with a plurality of rectangular through holes similar to a conventional watch band. Each of outer band 190 and inner band 194 are injection molded out of a durable thermo-plastic elastomer plastic commonly used for watch bands.

FIG. 13 shows a subset of two-handed band clasp 45 internal parts for clarity. A prong flexure A 158 is fixedly attached to a prong A 170 and a prong flexure B 154 is fixedly attached to a prong B 166. Prong flexure A 170 and prong flexure B 154 are configured aligned along the center line of inner band 194, and symmetrically about the centerline of prong hole 150. Each of prong flexure A 158 and prong flexure B 154 include a weld plate 162 portion that is spot welded to the top inside surface of clasp shell 146 (hidden in FIG. 3). Each of prong flexure A 158 and prong flexure B 154 are fabricated out of spring steel sheet metal and are stamped with a bend as exemplified by prong flexure A 158 in FIG. 13. Prong flexure B 154 is shown in a flexed, flattened state in FIG. 13. Each of prong A 170 and prong B 166 are stamped steel parts and are spot welded to each of prong flexure A 158 and prong flexure B 166 respectively.

FIG. 14 shows a clasp spring subassembly comprised of a presser A, a presser tab A, a C-spring A, a C-spring B, and release cap A 142. Presser tab A is injected molded out of acetal resin and is ultra-sonically welded to the center portion of presser A. Release cap A 142 and release cap B are injection-molded plastic parts. Presser A is a stamped steel sheet metal part and is fixedly attached by ultra-sonic welding to release cap A 142 at two locations on the inside vertical walls of release cap A 142. In another embodiment presser A 186 and presser B 206 are metal injection-molded steel parts. C-spring A 178 and C-spring B 174 are configured with a square slot in the end that fixedly engage with a bent feature in presser A 186, insuring that C-spring A 178 and C-spring B 174 are continuously engaged with and forcing release cap A 142 toward clasp shell 146. A presser B 206, a presser tab B 184, a C-spring C 202, a C-spring D 198, and a release cap B 138 all constitute a symmetrically identically configured clasp spring subassembly.

Each of C-spring A 178, C-spring B 174, C-spring C 202, and C-spring D 198 are fabricated out of spring steel sheet metal and are stamped with a permanent bend that is configured with a larger free width dimension—dimension W in FIG. 15—than the bend shown in the drawing figures. In FIG. 12, and FIG. 15, C-spring A 178, C-spring B 174, C-spring C 202, and C-spring D 198 are shown in an assembled state approximately 20% flexed so that there is a pre-load force acting to pull release cap A 142 and release cap B 138 against clasp shell 146.

FIG. 15 is a section view showing two-handed band clasp 45 in the locked band state. C-spring A 178, C-spring B 174, C-spring C 202, and C-spring D 198 function to pull presser A 186 and presser B 206, and thus release cap A 142 and release cap B 138, respectively, toward clasp shell 146. Presser tab A 182 and presser tab B 184 apply a straightening load on prong flexure A 158 and prong flexure B 154, respectively, which results in the placement of prong A 170 and prong B 166 into a band slot when prong A 170 and prong B 166 are substantially aligned with a band slot.

FIG. 16 shows two-handed band clasp 45 in the unlocked or released state. Release cap A 142 and release cap B 138 are simultaneously pulled away from clasp shell 146, compressing C-spring A 178, C-spring B 174, C-spring C 202, and C-spring D 198. Prong flexure A 158 and prong flexure B 154 are unloaded and return to a bent free state with the result that prong A 170 and prong B 166 are extracted from prong hole 150. In the released state, outer band 190 may be pulled freely through clasp shell 146 to loosen the band or fully remove outer band 190 from two-handed band clasp 45.

Alternative Embodiment—Amazon Alexa Gateway

In an alternative embodiment, gateway is implemented with the Amazon Alexa interactive application. In Fall Detection mode, in addition to the processes described above, a software application running on MCU also includes programming for real-time voice interaction between wearable band 1 and the Alexa gateway. The subject interacts with Alexa to provide their status, describe their location, or terminate the fall alert. Alexa will update the subject as to the actions taken, for example annunciating that the responsible parties (by name), and or help such as EMS, has been alerted to the event.

Alternative Embodiment—Smart Home Connected Assisted Devices and Hubs Including Amazon Alexa Gateway In an alternative embodiment, communication between smart home connected devices/system/hub may activate/deactivate or otherwise control 1) locking/unlocking doors, 2) home alarm system, 3) doorbell/outside video camera (real-time viewing, recording), 4) smart lightbulbs in rooms upon entry, for example where gateway with speaker capability or where an inexpensive Android mobile phone is implemented with the Amazon Alexa interactive application or other to create a secure, private wireless communication providing actions between wearable and other. Updatable firmware in gateway/mobile phone provides instructions to smart home connected home devices/hub to begin and end actions based on wearable band's signals that have been selected in the subject's web account in the cloud. Communication and actions through software, wearable band and connected devices extend user's safety and protection safely enabling connected devices to make actions.

In Fall Detection mode, in addition to the processes described above, software application running on MCU also includes programming for real-time voice interaction between wearable band and Alexa gateway. In Location mode, in addition to the process described above, software application running on the MCU also includes programming for real-time interaction between wearable band and Ring camera, simpliSafe gateway, smart light bulbs and the like.

Alternative Embodiments—LPWAN Communication

In one embodiment the periodic low power pulse transmission for location data, and Fall Alert messages configured to connect to a Low Power Wireless Network (LPWAN).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A location and fall sensing system, comprising:
- a wearable band that comprises:
  - a radio-frequency pulse transmitter configured to transmit a radio-frequency pulse transmission periodically,
  - a continuously sensing fall sensor, and
  - a microcontroller wake-able from a deep sleep mode by the pulse transmitter and by the fall sensor;
- a gateway communicably connected to a cloud server and configured to:
  - send a message to the cloud server if the radio-frequency pulse transmission is not received by the gateway within a specified period, and
  - send a message to the cloud server if a fall alert message from the wearable band is received.

2. The system of claim 1 where the wearable band includes a lockable band strap.

3. The system of claim 1 where the wearable band includes a button for causing an alert message to be transmitted to the cloud server.

4. The system of claim 1 where the band includes a low power display for displaying medical or identification information.

5. The system of claim 1 where the gateway is programmed to send a message to the cloud server if a signal strength of the radio-frequency pulse transmission is less than a specified signal strength value.

6. The system of claim 5 where the specified signal strength value may be changed using a web interface.

7. A method for detecting location and a fall, comprising:

wearing a wearable band that operates in a deep sleep power mode except for when a timer periodically causes a radio-frequency pulse transmission to be transmitted, or when a continuously sensing fall sensor senses a fall;

sending an alert message to a cloud server if the radio-frequency pulse transmission is not received, and sending an alert message to a cloud server if a fall alert message is received from the wearable band.

8. The method of claim 7 wherein the clasp on the band strap requires two-hands to release.

9. The method of claim 7, further comprising:

activating a button on the wearable band to cause an alert message to be transmitted to the cloud server.

10. The method of claim 7 where medical, identifying, or other information is shown on a display integral to the band.

11. The method of claim 7, further comprising:

sending an alert message to a cloud server if a signal strength of the radio-frequency pulse transmission is less than a specified signal strength value.

12. The method of claim 11, further comprising:

setting the specified signal strength value using a web interface.

* * * * *